United States Patent [19]
Vermeulen et al.

[11] Patent Number: 5,453,790
[45] Date of Patent: Sep. 26, 1995

[54] VIDEO DECODER HAVING ASYNCHRONOUS OPERATION WITH RESPECT TO A VIDEO DISPLAY

[75] Inventors: Christophe D. G. Vermeulen, Ramegnies-Chin; Frank O. Van Der Putten, Lede; Bart F. Voeten, Beerse, all of Belgium

[73] Assignee: Alcatel N.V., Amsterdam, Netherlands

[21] Appl. No.: 37,272

[22] Filed: Mar. 26, 1993

[30] Foreign Application Priority Data

Mar. 27, 1992 [EP] European Pat. Off. ............ 92870048

[51] Int. Cl.$^6$ ................................................. H04N 7/32
[52] U.S. Cl. ........................................ 348/410; 348/384
[58] Field of Search ................................. 348/409, 410, 348/716, 718, 384; H04N 5/907, 7/137

[56] References Cited

U.S. PATENT DOCUMENTS

| | | | |
|---|---|---|---|
| 5,185,819 | 2/1993 | Ng et al. | 348/409 |
| 5,227,882 | 7/1993 | Kato | 348/718 |
| 5,260,783 | 11/1993 | Dixit | 348/409 |

FOREIGN PATENT DOCUMENTS 0249985  12/1987  European Pat. Off. .

OTHER PUBLICATIONS

"IC Executes Still–Picture Compression Algorithms", by M. Leonard, Electronic Design, May 23, 1991, pp. 49–51 and 53.

"Aufbereitung der Meteosat–2–Signale", by Dr.—Ing. Roland Woitowitz et al, Electronik, vol. 36, Feb. 20, 1987, pp. 92–96.

"Video compression makes big gains" by H. Peng et al, IEEE Spectrum, Oct. 1991, pp. 16–19.

"A Variable Bit Rate Video Codec for Asynchronous Transfer Mode Networks" by W. Verbiest et al, IEEE Journal on Selected Areas in Communications, Jun. 1989, pp. 761–770.

*Primary Examiner*—Tommy P. Chin
*Assistant Examiner*—Richard Lee
*Attorney, Agent, or Firm*—Ware, Fressola, Van Der Sluys & Adolphson

[57] ABSTRACT

A video decoder is proposed which receives packets of video information relating to moving video images from a packet switching network. The video decoder provides for the elimination of a great deal of hardware overhead and also provides for increased flexibility compared to prior art decoders by letting the decoding process, implemented via a decoder (DEC1, DEC2), run asynchronously with respect to the display process, implemented via a display (DIS). Moreover, and also in contrast with prior art decoders, the video decoder is not explicitly synchronized to its corresponding encoder by explicitly recovering the system clock of the encoder. This is realized through buffering actions within a frame store memory (FSM) placed between the decoder (DEC1, DEC2) and the display (DIS). The variable length of such a buffer can be used to control the speed of the display process in order to prevent underflow or overflow of the latter buffer and corresponding image degradation. The latter is done via a control device (CON).

25 Claims, 4 Drawing Sheets

1

VIDEO DECODER HAVING ASYNCHRONOUS OPERATION WITH RESPECT TO A VIDEO DISPLAY

TECHNICAL FIELD

This invention relates to a video decoder receiving packets from a packet switching network.

BACKGROUND OF THE INVENTION

It is known for packets containing control information and video information, to be provided to a video decoder that is being able to process real time moving video images and that includes, decoding means deriving from at least said video information new units of decoded video information relating to a current video frame;

a memory module in which said new units are stored;

display means displaying said stored new units on a video screen.

Such a video decoder is well known in the art, e.g. from the article "Variable Bit Rate Video Codec for asynchronous transfer mode networks", by W. Verbiest and L. Pinnoo, IEEE Journal on selected areas in communications, Vol. 7, No 5, June 1989, pp, 761–770 and more particularly point II.E "VBR Decoder" and FIG. 8 thereof, the latter figure-showing a block schematic of such a video decoder.

As all known video decoders of the above type, the referenced decoder works synchronously with its corresponding encoder, i.e. the clock signal controlling the latter encoder is reproduced by the decoder and used to control the decoder. This synchronous operation is up to now assumed to be mandatory for real time video processing of moving video images sent over packet switching networks. The reason therefore is given in the article "Packet Video integration into network architecture" by Karlsson and Vitterbi, which appeared in the same issue of the above Journal, and more particularly in point V on pp 745–746 "Resynchronization of video" thereof. Without this synchronous operation the decoder could indeed process the packets too fast or too slow with respect to the generation of packets by the encoder. When working too fast, as depicted in FIG. 8b of the last referenced article, the decoder would have to discard packets arriving too late to be taken into account for the reconstruction of an image, When working too slow, as depicted in FIG. 8c, an ever increasing number of packets would have to be buffered by the decoder, inevitably leading to buffer overflow and hence again to packet loss.

Apart from the above mentioned need for synchronous working of the encoder and the decoder, the latter decoder has also to take into account possible jitter inherent to asynchronous transfer mode networks and caused by a variable transmission delay of the packets over the network, which additionally complicates the structure and design of the decoder. Indeed, in order to operate synchronously with its corresponding encoder, the decoder has to perform its decoding actions at well-defined instants in time determined by the system clock of the encoder. Due to the above jitter it could however occur that a packet arrives too late to be processed at the above instant. To avoid this, the packets arriving at the decoder are stored in an input buffer, where they are delayed to achieve for every packet a fixed predetermined delay, as depicted in FIG. 7 of the last referenced article. In this way the input buffer acts as a dejittering unit which is read under control of the decoder clock, the latter clock being reconstructed by means of for instance a phase locked loop to match the encoder clock. Due to the statistical nature of the delay jitter packet loss cannot be avoided with finite input buffers and finite fixed delays as evidenced by FIG. 8a of the last referenced article; minimizing this packet loss requires relatively large input buffers.

Referring again to the first referenced article by W. Verbiest and L. Pinnoo the consequence of the above mentioned need for synchronization and dejittering is made clear.

The decoding means described in the article includes a Variable Length Code decoder (VLC Decoder) and a Differential Pulse Code Modulation Decoder (DPCH Decoder). The latter decoder is controlled by a RAM module using the control information extracted from the packet by a depacketizer and uses a memory module, called a frame store memory, to decode predictively coded video information, i.e. video informtion relating to a previous frame is stored in the memory module and used to predict corresponding video information of a new frame. The display means is schematically represented as a Digital to Analog Converter (DAC) and a monitor or video screen. The above mentioned need for synchronization results in the use of a Digital Phase Locked Loop (DPLL), whilst the need for dejittering results in the use of a dejittering unit or input buffer. The latter input buffer has to be dimensioned in order to reduce packet loss caused by the delay jitter and will typically have to be large enough to store video packets corresponding to one half of a video frame.

Summarizing, a drawback of video decoders of the type disclosed in the latter article is that the structure thereof is rather complex due to the circuitry needed for synchronization of the decoder clock with the encoder clock, e.g. by using a phase locked loop, and for elimination of the delay jitter for which a relatively large input buffer is needed. Moreover such decoders are rather inflexible due to the timing constraints resulting from the synchronous operation of the decoding means and the display means with respect to each other, as is clear from the mentioned articles.

DISCLOSURE OF INVENTION

An object of the present invention is to provide a video decoder of the above type but without the above mentioned drawbacks.

According to the present invention after one of said new units of decoded video information is derived and stored in said memory module, said display means retrieves a variable number of said stored new units from said frame store memory for display, before retrieving said one unit.

Using a prior apt video decoder and processing the packets as they are received from the network and displaying the decoded units at the same rate they become available results in a display clock with variable rate, as explained hereafter, which is incompatible with existing video display standards such as CCIR 601 or PAL. The variable rate of the display clock is not only due to the delay jitter but also, if variable bit rate coding is used as in the first referenced article, of the varying information density in the received packets. Indeed, in case of variable bit rate coding, some packets carry information related to a lot of units which results in a fast decoding rate and hence also in a fast display rate, whereas other packets carry information relating to only a few units accordingly resulting in a slow display rate.

In accordance with the present invention on the contrary, the display means and the decoding means work asynchronously with respect to each other. The decoding means handles the packets as they arrive from the packet switching network, i.e. without first eliminating possible delay jitter, and stores them in the memory module, at the same rate as the display means whilst the display means retriever the new units of decoded video information from the memory module at an even rate possibly different from the storage rate and unaffected by the delay jitter and/or by the previously mentioned varying information density in the received packets, which are in this way eliminated in the memory module through buffering. The display clock can thus be designed to have a stable rate independently of the encoder clock rate, which can be determined, if necessary, solely on the basis of local decoder information as evidenced from further features.

A characteristic feature of the present invention is that said decoding means retrieves from said memory module old units of decoded video information relating to a previous video frame to derive therefrom said new units thereby decoding predictively coded video information.

In such a video decoder the memory module is called a frame store memory. It stores the old units to realize predictive decoding of the coded video information. The earlier mentioned buffering action between the decoder means and the display means can now be realized by a buffer embedded in the larger frame store memory, the latter buffer further being called implicit buffer, and which has a length equal to the earlier mentioned variable number and which continuously alters not only its length but also its position within the frame store memory as data is stored by or retrieved from the frame store memory by respectively the decoding and the display means. Indeed, the buffer's first location corresponds to the frame store memory position where the next unit is stored by the decoding means and its end location corresponds to the position where the next unit is to be retrieved by the display means, which means that the buffer moves in the frame store memory. The variable number of units are those units stored in the frame store memory which have to be displayed from the moment a new unit is stored, until the display of the latter unit. It has to be further noted that when using predictive coding techniques the frame store memory has to be large enough to store all the units of decoded video information pertaining to one frame the latter units being used to predict the value of the units pertaining to a corresponding next frame. Due to its needed capacity for decoding predictive coded images, the frame store memory is large enough to contain the mentioned implicit buffer and no additional memory capacity has to be foreseen for the latter buffer.

Image degration of the displayed image occurs when the display means catches up with the decoding process thereby causing what is called underflow of the implicit buffer. However, as the latter buffer is embedded in the larger frame store memory the mentioned underflow results in some old units being displayed more than once. No information is lost and hence the correctness of new units of decoded video information is not affected.

image degradation also occurs when the decoding means catches up with the display means causing overflow of the implicit buffer. The only error then incurred is that some new units will never be displayed.

Whereas for prior art synchronous decoders, under- of overflow of the input buffer resulted in loss of synchronization and in the need to reset the video decoder, for the present invention they only give rise to a temporary and local effect of the display, as following from the above, the correctness of newly decoded units not being affected by the latter under- or overflow.

An important aspect of the present invention is that said decoder further includes a control means which monitors said variable number and which increases or decreases the frequency of a system clock, included in said video decoder and controlling at least said display means, thereby preventing said variable number from becoming larger or smaller than a first and second predetermined number respectively.

In this way the above mentioned image degradation due to the over- or underflow of the buffer is in a large extent avoided, irrespective of the buffer being an implicit buffer embedded in a larger frame store memory or not. When the variable number tends to a first predetermined number, e.g. zero for underflow, which can for instance occur when the instantaneous packet arrival rate is very low, then the display process is slowed down by the system clock to prevent underflow. In the opposite case when the variable number tends to a second predetermined number, e.g. the maximum length of the implicit buffer, the display process is speeded up to prevent overflow. Because of the statistical nature of the delay jitter the speeding up or slowing down of the display process is a low frequency process which is not visible on the display. The display process however is, with this mechanism, indirectly synchronized with the encoder clock. Indeed, the average frequency of the system clock of the display means is locked to the average arrival rate of video information and hence to the encoder clock and this without the need for complex timing information extraction and digital phase locked loop circuitry. The delay jitter only modestly influences the speed of the system clock as most of it is absorbed in the implicit buffer as explained earlier. Moreover as only a loose coupling exists between the decoding means and the display means and between the decoder and the encoder no flexibility is sacrificed. E.g. when, during blanking periods, the display means has to be inactive the decoding means does not have to stop its processing as well.

An ancillary feature of the present invention is that said system clock additionally controls at least said decoding means.

To be noted in this respect that the asynchronous nature of the video decoder according to the present invention does not stem from independent system clocks but from the fact that, irrespective of the display means, the decoding means processes the received packets as they arrive without being hampered by display requirements.

If the decoding means has no packets to process it becomes inactive allowing the display means to catch up and on the other hand, if necessary, the overall system clock of the decoder is slowed down tuning the decoder in a simple way to the output information rate of the encoder.

A further feature of the present invention is that said decoder further includes a memory module controller controlling at least a first and second pointer used by said decoding means and said display means respectively, said pointers indicating which memory location of said module memory is to be used by said respective means to respectively store or retrieve said units, and that the values of said first and of said second pointers ape asynchronously updated by said memory module controller when their respective means have respectively stored or retrieved one of said units.

More concretely, the memory module controller determines the variable position of the implicit buffer within the larger frame store memory since the first pointer Indicates the first location of the implicit buffer whereas the second pointer indicates the end location, memory and highlights the need for a separate controller to manage the implicit buffer. The latter controller through its control action on the implicit buffer can also manage and exploit the flexibility offered by the present invention as will-be clarified below.

Still another feature of the present invention is that said memory module controller performs said updates according to a memory map mapping a location of each of said units within a video frame onto a memory-location of said memory module.

The memory module controller is thus specifically suited for predictive coding techniques as it knows from the memory map which unit of a frame belongs to which memory location. It can further monitor said variable number since it can, indeed from the first and second pointer, derive with the aid of this memory map which units are processed by respectively the display and the decoding means and how many units within a frame are comprised between these units. With this memory map the offered flexibility can optimally be exploited as will be clarified below.

An important aspect of the present invention is that said module memory consists of a dual port random access memory including at least one dynamic random access memory and at least one serial access memory, that said dynamic random access memory is accessed by said decoding means to store said new units on locations indicated by said first pointer and to retrieve said old units from a location indicated by a third pointer also controlled by said memory module controller, and that all of said units corresponding to one line of an image to be displayed are transferred under control of said memory module controller from said dynamic random access memory to said serial access memory and said display means retrieves said units from locations in said serial access memory indicated by said second pointer.

Dual port memories are well known in the art and commercially available, e.g. the Texas Instruments chip TMS48C121. Such memories are particularly suited for use in the present invention due to their dual port, which permits virtually simultaneous access by the decoding means and the display means. Normal RAMs could also be used but they would have to be chosen in such a way that they are fast enough to cope with simultaneous accesses. Such fast RAMs are either static, expensive RAMs, or large parallelized dynamic RAMs.

Essentially the dual port memory disconnects the display and the decoding means in hardware.

The DRAM performs the functions already performed by prior apt frame store memories serial access memory (SAM) is used by the display means when reading the decoded video information. The latter information is read image line per image line so that a simple serial access memory, such as the SAM, holding all the information pertaining to one such line indeed suffices for this purpose. A transfer operation, performed for instance during blanking periods of the display, is required to transfer the information to be read from the DRAM to the SAM thereby allowing the display means to read the frame store memory independently from the decoding means and at its own even rate without complex addressing operations.

The memory module controller, also called frame store controller in case of decoding of predictive coded information, is somewhat more complex than prior art controllers but on the other hand cheaper memories can be used.

A particularly advantageous feature of the present invention is that said video information is block coded using a variable bit rate technique, and that said first predetermined number is equal to the number of units contained in one image line and that said second predetermined number is equal to the number of units contained in one image frame minus one stripe.

Block coding is well known in the art, e.g. from the first referenced article by W. Verbiest and L. Pinnoo. It results in a very efficient compression of the digital video information to be sent over the network. In case of block coding the present invention is particularly advantageous because the memory module can be used for the block to line conversion needed when decoding the block coded information. Prior art decoders for decoding of block code information indeed have to convert the data from a block format at the output of the decoding means to a line format at the input of the display means, as video is displayed line per line. Therefore these decoders include an additional memory wherein the blocks are written and, after a certain delay, read out by the display means when all new units of a line have been received. According to the present invention the latter delay can be realised by the memory module control means, the delay being at least equivalents to one image line. If this delay is maintained there is no mixing of new and old units.

It is to be noted that the variable number could as well be fixed and corresponding to a suitable delay, The decoder would then operate synchronously with the encoder but there would still be no need of an additional block to line conversion memory.

A further advantage of the above particular embodiment is that normally, when synchronous operation is required as in prior art systems, variable bit rate coding necessitates the extraction of time stamps from the received packets to reconstruct the encoder clock. With a video decoder according to the present invention these time stamps are superfluous as no synchronization with the encoder clock is required.

A video decoder according to the invention is thus equally well suited for decoding video information from fixed as from variable bit rate encoders and this without any additional hardware cost compared to the prior apt decoders.

A further advantageous feature of the present invention is that said memory module capacity, is additionally used by said memory module controller to realize motion compensation by using a non-permanent memory map, mapping a location of each of said new units within an image frame onto memory locations of said memory module, each of said new units being stored in locations other than the location in which corresponding ones of said old units were stored.

In order to achieve motion compensation, which is used to realize efficient compression and is well known in the art, e.g. from the article "Video compression makes big gains", IEEE spectrum, October 1991, by H, Peng et al, prior apt systems using a synchronous video decoder have to save part of the old units in a separate memory. This in order not to overwrite old units corresponding to an already decoded part of the image frame, with newly received units. In the present invention motion compensation can be realized by using the memory module and without significant extra hardware cost. Only some additional functionalities in the memory module controller are needed to allow use of the non-permanent memory map.

Yet another feature of the present invention is that said units are subdivided in a plurality of categories, units corresponding to different categories carrying different information relating to a same image element, and that said units of video information of different categories are processed by said decoding means regardless of their category said memory module controller demultiplexing said units according to the category they belong to by writing said units in appropriate memory locations within said memory module.

In the first referenced article by W. Verbiest and L. Pinnoo and more particularly in FIG. 2 two such categories are considered namely the luminance and the chrominance of an image. Due to the timing constraints in synchronous decoders described in the article a decoding means has to be provided for each unit category. Thanks to the above feature of the present invention the decoding means has not to differentiate between these two types of information, demultiplexing of the different categories being done by the frame store controller by storing the units at appropriate memory locations within the frame store memory according to their type.

Further characteristic features of the present invention are that said video Information corresponds to images of one of a plurality of resolutions, said one resolution being identified by said video decoder based on at least part of said control Information and that said memory module controller adapts said video decoder to said one resolution by using a corresponding memory map of a plurality of memory maps, and that said video decoder can at any time change to a display of a still picture by not refreshing said memory module with new units of video information, and that said memory module controller is able to control said video decoder to display images differing from those contained in said video information by controlling said decoding means to calculate Intermediate new units of decoded video information and, to store at least part of said new units, including said intermediate new units, according to a memory map corresponding to a desired display, said desired display being signalled to said memory module controller by an appropriate control input signal.

The above features not only allow to freeze the display or to zoom according to an external control signal which is input to the frame store controller and possibly comes from a viewer, but they moreover allow the video decoder to receive and display information according to various standards of resolution, e.g. CIF and CCIR 601, by using a related part of the control information of the packet as an internal control input to the frame store controller.

An important advantage of the last mentioned feature is that, regardless of the resolution of the images contained in the incoming video information, the video decoder can be controlled to display images according to a predetermined resolution, e.g. the resolution defined CCIR 601. The fact that the decoding means works asynchronously with regards to the display means can be used for creating alternative new units e.g. via the well known technique of upsampling. To this end the decoding process has to be speeded up by for instance deriving from the system clock a clock signal with higher frequency. With the alternative new units, a memory map for CCIR 601 can be filled up if the incoming video information relates to images having a resolution such that the number of units per image frame is less than for CCIR 601. Additionally no significant hardware change, except in the frame store controller, is needed to switch to e.g. the Joint Photographic Experts Group JPEG's impending standard for still pictures. Again such a switching operation can be controlled by-the control information. These and other objects, features and advantages of the following detailed description of a best mode embodiment thereof, as illustrated in the accompanying drawing.

BEST MODE FOR CARRYING OUT THE INVENTION

Figure 1:
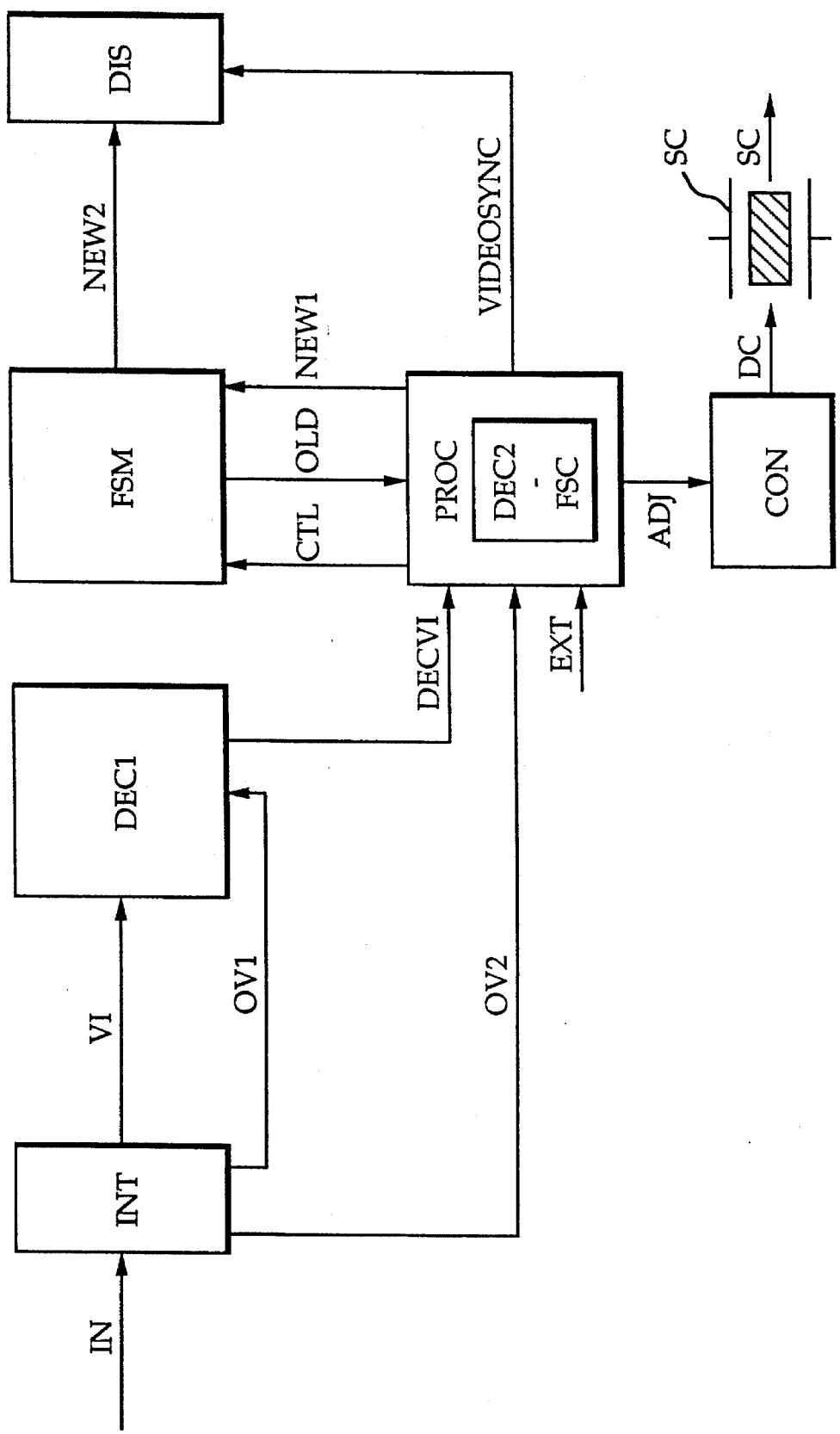
FIG. 1 shows a functional block diagram of a video decoder according to the present invention.

The video decoder shown in FIG. 1 is part of an Asynchronous Transfer Node ATM Broadband ISDN BISDN network (not shown). Such networks and their properties, are well known in the art wherefore they are not further described.

The video decoder receives packets from the ATM network via an input line IN. The information contained the packets is transformed and displayed on a video screen as described later.

The packets are applied to a first block of the decoder which is an interface module INT.

The interface module INT performs ATM header error control and other well known control functions and demultiplexes and unpacks the data contained in a received packet. The latter demultiplexing and unpacking functions of the INT module are obvious to realize by a person skilled in the art and are therefore neither shown nor described in detail. The interface module INT applies video information VI extracted from the received packet on a like named output line VI and first control information OV1 and second control information OV2 also extracted from the received packet on like named control lines OV1 and OV2 respectively.

The above mentioned line VI is Connected to a decoding module DEC1, forming a first part of a decoding means, which under control of the first control information OV1 decodes the video information VI and so applies at an output DECV1, connected to a pixel processor PROC comprising a second part of the decoding means DEC2 and a frame store controller FSC, a like named signal consisting of decoded video information DECV1.

The latter frame store controller FSC stores under control of the second overhead information OV2 a binary signal consisting of new units of decoded video information NEW1 via a like named data line NEW1 in a frame store memory FSM which is at least large enough to store all the units pertaining to one video frame. The latter signal NEW1 is derived in DEC2 from the previously mentioned signal DECV1 possibly taking into account data consisting of old units of decoded video information OLD received on a like named input line OLD from the frame store memory FSM. Whether or not the latter data is to be used, i.e. whether or not interframe predictive coding is used, as will be explained later, is decided under control of the second overhead information OV2.

The pixel processor PROC has one further input line EXT on which external control signals EXT are applied and one further output ADJ at which a like named Signal ADJ is generated. ADJ is used to adjust the frequency of a system clock signal SC as will again be explained later. The pixel processor PROC finally has a control output-CTL connected to the frame store memory FSM on which like named control signals CTL are applied and a control output VIDEOSYNC connected to a display means DIS.

The frame store memory FSM receives the signal NEW1 via input line NEW1 and has a first output OLD via which the signal OLD is applied to the pixel processor PROC and a second output NEW2 on which like named signals NEW2 are generated, NEW2 consisting of new units of decoded video information. The frame store memory FSM further has a control input CTL connected to the line CTL and via which it receives the control signals CTL. The second output line NEW2 is connected to the display means DIS which further transforms and finally displays the video signal. This display means DIS further has a control input VIDEOSYNC on which the like named signal is applied originating from the pixel processor PROC and needed for the display function as described below.

Referring again to the output ADJ of the pixel processor PROC, this output line ADJ is connected to a control means CON which derives from the signal ADJ a frequency signal DC generated at a control output DC. The latter signal DC controls the system clock SC which produces a like named signal SC. SC is applied to the blocks INT, DEC1, PROC, CON, FSM and DIS after appropriate clock divisions. For clarity of the figure neither the clock signals applied to the latter blocks, nor the clock divisions are shown.

As will be explained in details later, the display means DIS retrieves units of information with a rate directly proportional to the frequency from the system clock SC from the frame store memory FSM and processes the units for display purposes. The decoding means DEC1 and DEC2 store decoded units under control of a clock signal also derived from SC, but not necessarily having the same rate as the clock signal controlling DIS. This means that DIS and DEC1, DEC2 work asynchronously. FSM in a way isolates the processing of the units by the display means DIS from that of the decoding means DEC1, DEC2.

DEC1 and DEC2 can process the incoming video information without first eliminating the delay jitter inherent to asynchronous transfer networks because before the decoded video information DECV1 is passed through to the display means DIS it incurs a variable delay, through buffering action later described, In the frame store memory FSM. The delay jitter thus does in this way not influence the quality of the displayed image. Although the decoding means DEC1, DEC2 is also controlled from the earlier mentioned system clock SC the asynchronous, independent processing of the units by the latter means and by the display means is not hampered as the rate at which the decoding means DEC1 and DEC2 processes units of video information is not directly proportional to SC. The decoding means DEC1, DEC2 can indeed remain inactive due to a late arrival of packets because of delay jitter or can process different units at a different speed. From the above it is clear that it is equally well possible to control the decoding means DEC1, DEC2 with a system clock totally independent from the system clock SC.

When predictive coding techniques are used the frame store memory FSM is needed to store units pertaining to a previous frame and buffering action for the display function are provided via an implicit buffer embedded in a larger frame store memory.

Figure 2C:
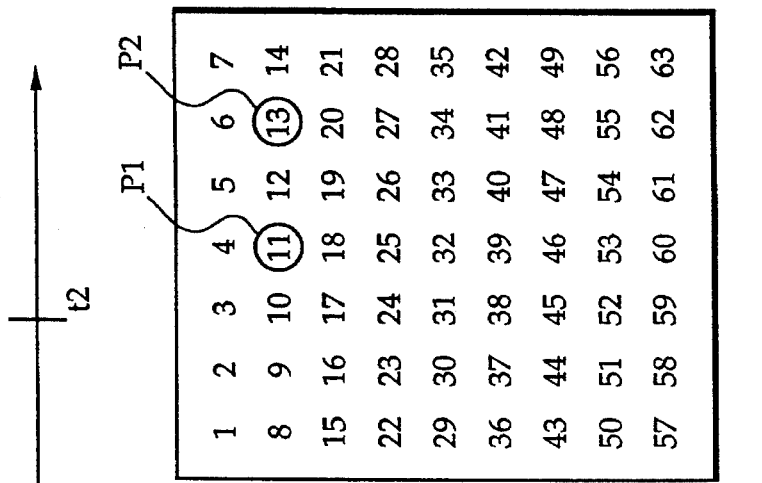
FIGS. 2a to 2c show the principle of the operation in the frame store memory FSM of FIG. 1 in a highly simplified manner.
Figure 2B:
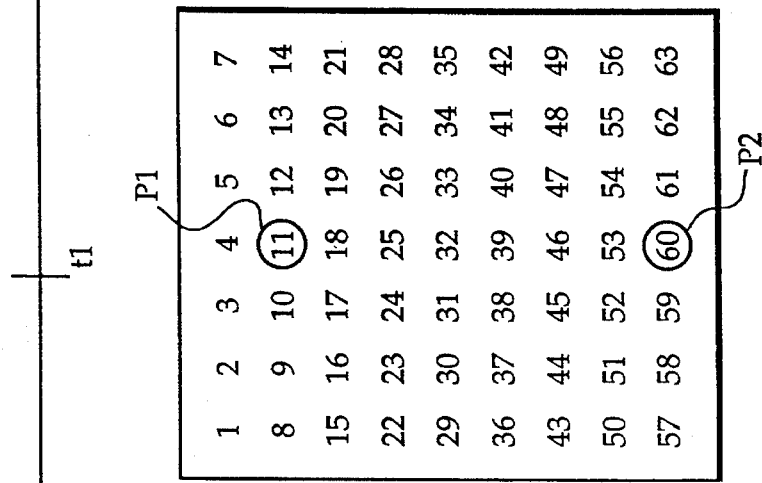
Figure 2A:
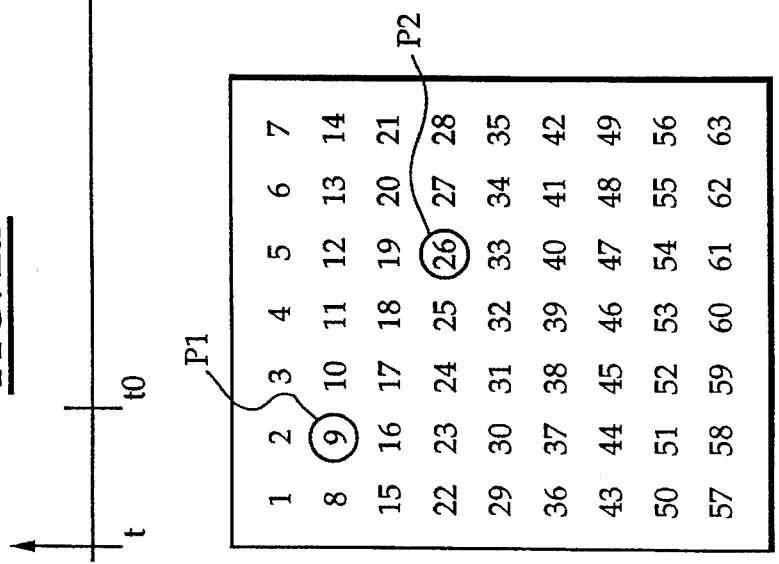

Turning now to FIGS. 2a to 2c the principle of such a moving implicit buffer within the larger frame store memory is shown. In an embodiment of the present invention not using the frame store memory for decoding predictively coded video information this description, relating to FIGS. 2a to 2c, is not applicable as a normal variable length FIFO buffer, the length of which is equal to a variable number, can then be used as frame store memory FSM.

It is further to be noted that the only aim of FIGS. 2a to 2c is to clarify the principle of the implicit buffer in the frame store, so that highly simplified examples of the frame store memory FSM are used.

FIG. 2a shows the content of a frame store memory which contains 9 lines of 7 positions, each position containing information of a corresponding pixel in an image frame. Pixel information in subsequent positions logically correspond to subsequent pixel positions in the to be displayed image, consequently a very simple memory map, mapping positions within an image frame to memory locations, is used.

The start location of the implicit buffer is the position in which the next pixel information to be decoded by the decoding means DEC is to be stored, e.g. in FIG. 2a which shows the frame store at time instance to the start location 9 is indicated by a first pointer P1. The end location is the position from which the next pixel information is to be retrieved by the display means, e.g. in FIG. 2a the end location 26 is indicated by a second pointer P2. From the above considerations it follows that position 9 and 26 of FSM respectively correspond to pixel positions 9 and 26 of the image frame. At time instant after pixel information 9 is stored, the display means may start retrieving the information pertaining to 46 pixels, namely at locations 26 to 63 and 1 to 8.

FIG. 2b shows the frame store at a second time instant t1. The first pointer P1 has proceeded to position 11 and the second pointer P2 has moved consideraly faster to position 60. The above mentioned number of pixels that may be retrieved is now only 14. Thus the number of pixels that may be retrieved is variable. The fact that a variable number of pixels can be retrieved is for instance applied when the decoding means receives few packets, due to e.g. delay jitter, and the display means then catches up with the work load at an even rate.

FIG. 2c shows a frame store at a third time instant t2. In this figure it is shown what happens when the variable number of to be retrieved pixels is not kept within a range between a first, e.g. zero, and a second, e.g. 63, predetermined number. In this figure the first and second pointer have crossed each other, in a way turning the implicit buffer inside out. The first pointer P1 has stayed in position 11, possibly because of the delay jitter, whilst the second pointer P2 has further moved to position 13. This means that the display means has displayed old pixels relating to a previous frame, namely pixels 11 and 12 not yet refreshed by the decoding means DEC1 abd DEC2. In other words the pixels now in positions 11 and 12 have been displayed more than once. The above effect, depicted in FIG. 2c, corresponds to an underflow of the implicit buffer which as stated above results in some pixels being displayed more than once. The opposite effect (not shown) is equally well possible and arrises when P1 catches up with P2 which results in an overflow of the implicit buffer now leading to image degradation because some decoded pixels are never be displayed namely those pixels located just after the memory location indicated by the second pointer.

The above mentioned image degradation relating to FIG. 2c can be acceptable because the correctness of the further decoding is not affected and the image degradation is thus both local and temporal. It can be avoided by keeping the variable number within a predetermined range, e.g. from 0 to 63. This is realized by the control means CON monitoring the variable number and adapting the processing speed of the display means DIS according to the result of this monitoring as will be described in detail with reference to FIG. 7.

To be noted that in any case, e.g., even when the control means is used but due to extreme circumstances falls to prevent the implicit buffer from under- or overflow, the under- or overflow of the implicit buffer has a much less dramatic effect than the under- or overflow of input buffers in prior art decoder. Indeed, in the latter case synchronization is lost and the decoding process has to start again from scratch resulting in severe image degradation whereas the present invention will only display same units incorrectly wherefter, and without special measures to be taken, automatically correct operation is resumed.

One case in which this crossing of both pointers is acceptable is when the video decoder is externally controlled to freeze the image whilst receiving a moving image. To freeze the image it suffices to deactivate temporarily the decoding means DEC1 and DEC2 whilst letting the display means DIS display further the now stationary content of the frame store memory FSM. To this end the eventual loose coupling between the decoding and the display rate, realized by the control means CON, has to be de-activated by the frame store controller FSC. The latter de-activation is automatically achieved in the present embodiment when no action of the control means CON takes place in the absence of received packets. The latter feature and other advantages will be described in detail with reference to FIGS. 5 to 7.

From the above follows that, there is no need to reconstruct the encoder clock, e.g. by using a phase locked loop, to synchronize the decoder with the corresponding encoder. Also a dejittering unit in the form of a large input buffer, realizing a fixed delay for the received packets is made superfluous in this embodiments since the delay jitter of the packets is eliminated in FSM. The interface module INT might however include a smaller input buffer to ensure, as will be explained later, that the decoding means does not have to stop processing in the middle of one block of video information when block coded signals are used. Such a smaller input buffer is also required for ATM interface functions such as header error control and error correction.

Summarizing, the interface module INT only provides basic functions and the decoding means DEC1 and DEC2 processes the incoming packets as they arrive without first eliminating the delay jitter.

The interface module INT provides minimal control information on the lines OV1 and OV2 to DEC1 and PROC respectively.

Figure 3:
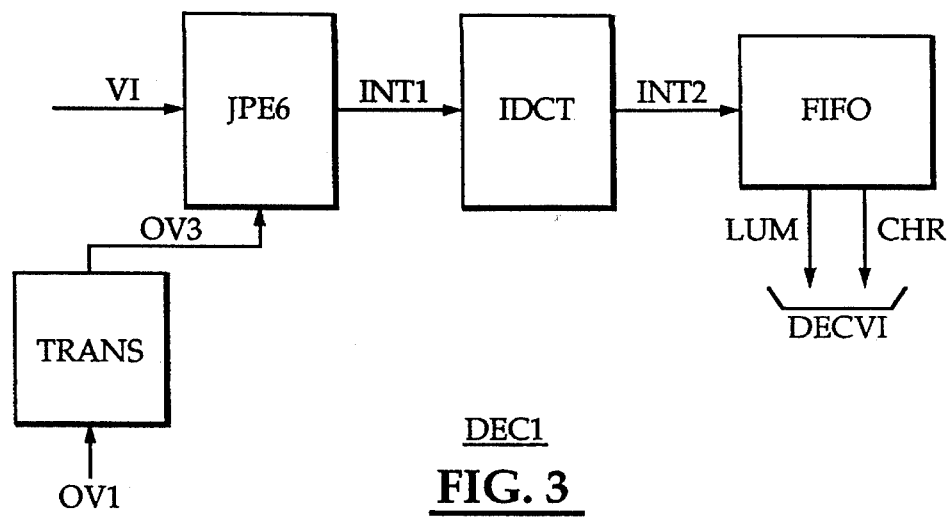
FIG. 3 represents a more detailed view of the decoding module DEC1 of FIG. 1.

With reference to FIG. 3, the decoding module DEC1 is now briefly described. This decoding module DECI only forms a first part of the decoding means a second part DEC2 being situated in the pixel processor PROC which also includes the frame store controller FSC.

The decoding module DEC1 realizes the present state of the art coding techniques resulting in efficient compression. It receives the video information VI via terminal VI and the first control information OV1 via the line OV1. VI is applied to a decoder JPE6 and OV1 is applied to a translation logic block TRANS transforming it into third control information OV3 which is applied via a like named signal line OV3 to the decoder JPE6.

JPE6 transforms the video information VI under control of the third control information OV3 in a first intermediary signal INT1 applied to a like named output line INT1. The signal INT1 is applied to an inverse Discrete Cosine Transform block IDCT which produces therewith a second intermediary signal INT2 again applied to a like named output line INT2. The latter signal INT2 is then shifted into a buffer FIFO. From this buffer FIFO a first and a second output, LUM and CHR respectively, together constitute the output line DECVI. The output lines LUM and CHR carry like named signals, LUM and CHR respectively, which consist of luminance and chrominance data.

The decoder JPE6 decodes VI according to an impending standard of the Joint Photographic Experts Group as for instance described in Electronic Design of May 1991, pp. 49–53, by M. Leonard and obtainable as IC L64745 from LSI Logic Corp. This decoder is specifically designed for still pictures but is here used for decoding moving images as no standards in this field are issued yet.

The decoder JPE6 is controlled by the third control information OV3 which indicates the variable length codes and quantizers that were used in the corresponding encoder which has generated the received packets.

Decoders such as JPE6 and translation logics such as TRANS are well known in the art and obvious to implement for a person skilled in the art. They are therefore not described in detail.

The first intermediate signal INT1 generated by JPE6 is transformed in a second intermediate signal INT2 in IDCT. Circuits realizing inverse direct cosine transform functions are also well known in the art. One such a circuit is for instance realized in the 1C L64735 of LSI Logic Corp.

The signal INT2 consists of units of decoded video information, i.e. bytes of luminance and chrominance pertaining to a pixel.

It is to be noted that due to the asynchronous nature of the present video decoder only one decoding module DEC1 of the above type has to be provided whereas in prior art decoders the luminance and chrominance signals are decoded separately in order to meet the timing constraints without further complicating the design. Indeed, because the decoding module DEC1 can handle the incoming video information independently from the display module one decoding means suffices for both categories of information. In order to efficiently demultiplex the second intermediate signal INT2 in its chrominance and luminance part for further processing the buffer FIFO is provided.

Since the above information is sufficient for a person skilled in the art to implement the decoding module DEC1, it is not described in more detail.

It is to be noted that in order to avoid that the decoding module DEC1 would have to cope with a peak bit rate of incoming data, which is due to the statistical fluctuations of the delay differ, the earlier mentioned buffer in the interface module INT of FIG. 1 is used to somewhat smooth out the worst case effect of peak bit rate, thus alleviating the design of the decoding module DEC1.

Figure 4:
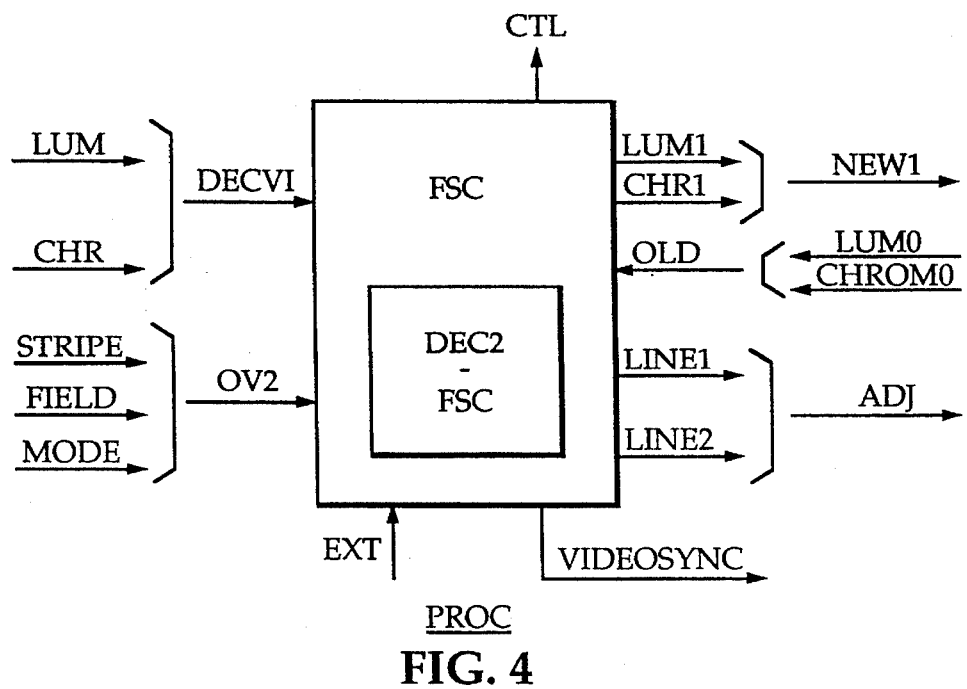
FIG. 4 schematically shows the various inputs and outputs of the pixel processor PROC of FIG. 1.

With reference to FIG. 4 the pixel processor PROC will now be functionally described.

FIG. 4 only details the content of the various input and output signals of PRGC and the form of the like named input and output terminals.

To be noted that PROC incorporates both the second part of the decoding means DEC2 and the frame store controller FSC as mentioned earlier. The operation of the pixel processor PROC is best described functionally as done hereafter from which description the pixel processor PROC can be implemented by a person skilled in the art.

FIG. 4 shows that the decoded video information DECVI consists of luminance LUM and chrominance CHR0M parts as received from the decoder DEC1 and carrying information relating the luminance and chrominance part respectively of corresponding pixels of a frame. A second input signal of old units of video information OLD is in similar manner constituted by luminance LUM0 and chrominance CHR0M0 parts retrieved from the frame store memory FSM. Further also the output signal of new units of video information NEW1 is subdivided in luminance LUM1 and chrominance CHR0M1 parts which are stored in the frame store memory FSM. How LUM0, CHR0M0, LUM1 and CHR0M1 are obtained by and from FSM will be explained later.

Another input OV2 to the frame store controller FSC carries the like named signal OV2 which is the second control information constituted by, as shown in FIG. 4, stripe Information STRIPE, field information FIELD and mode information NODE as generated by INT. The information contained in STRIPE and FIELD is used to indicate which part of the image is currently being decoded. The mode information MODE indicates the coding mode used for the currently decoded image part and indicates e.g. intraframe coding or interframe predictive coding.

A further output ADJ carries the clock-adjust signal ADJ constituted by a first line number LINE1 and a second line number LINE2 which will be described in detail below with reference to FIG. 7.

A last input is the external control input EXT and a last output is VIDEOSYNC which is connected to the display means DIS.

The control signal CTL is used by the frame store controller FSC to control the frame store memory FSM and will be described in detail when the latter memory is described with reference to FIG. 5.

To be noted that coding techniques such as interframe predictive coding and motion compensation referred to hereafter are well known in the art, e.g. from the article "Video compression makes big gains", IEEE Spectrum, October 1991, by H. Peng et al.

If the mode information MODE indicates that Interframe predictive coding was used then the decoding part DEC2 of the pixel processor PROC adds the decoded video information DECV1 to information pertaining to old units of decoded video information OLD which it retrieves from the frame store memory FSM.

It then applies an inverse predictive coding algorithm, many of which are described in the art, and derives new units of decoded video Information NEW1 which it provides on to the signal line NEW1 to store these new units in the frame store memory FSM.

When, on the other hand MODE Indicates that motion compensation has to be provided then the pixel processor PROC reads a specific part of the frame store memory FSM which is indicated to the frame store controller FSC by a motion vector also transmitted within the mode information. The question of motion compensation will be discussed in detail further below.

It has to be noted that the information retrieved via OLD is in fact information NEW1 previously stored when handling in DEC pixel information pertaining to a corresponding previous image part.

Figure 5:
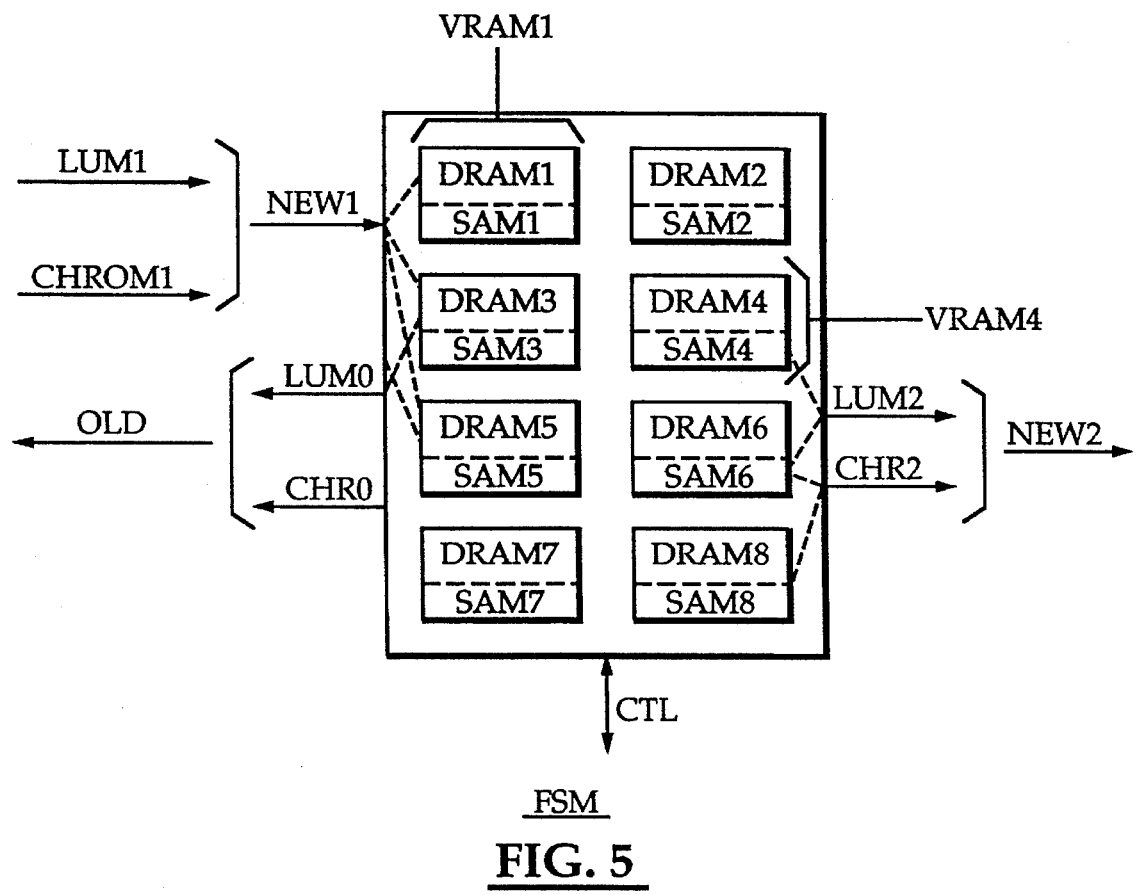
FIG. 5 is a schematic diagram of the frame store memory FSM of FIG. 1.

The signal VIDEOSYNC is constructed by PROC based on the contents of CTL and indicates the beginning of an image line to be used by the display module The frame store memory FSM depicted in FIG. 5 is a dual port memory which is well known in the art and can for instance be realized by combining 8 TNS44C251-100 IC's from Texas Instruments. The frame store memory FSM has a first input NEW1 on which like named new units of decoded video information NEW1 are provided by PROC. They are constituted by luminance LUM1 and chrominance CHR0M1 parts respectively. An output NEW2 of this memory also carries new units of decoded video information NEW2 constituted as above by parts LUM2 and CHR2. At another output OLD like named old units of decoded video information OLD are retrieved. They are constituted by a luminance part LUM0 and a chrominance part CHR0. The frame store controller FSC of PROC controls this memory via control terminal CTL.

The internal organisation of the frame store memory FSM is only schematically shown and consists of 8 dual port memories VRAM1 to VRAM8, each of these dual port memories or VRAMs being built from a dynamic random access memory or DRAM and a serial access memory SAM. The latter DRAMs and SAMs are again numbered DRAW1 to DRAM8 and SAM1 to SAM8 respectively. As also schematically shown in FIG. 5 the new units NEW1, coming from the frame store controller FSC and described above, are stored in one of the DRAMS. Also the old units OLD, to be used by the frame store controlled FSC, are retrieved from these DRAMs. The new units NEW2 to be used by the display means DIS however are retrieved from the SAMs, The underlying principle of the present invention is to disconnect the decoding process (which ends in the decoding part DEC2 of the pixel processor PROC) from the display process realized by DIS.

By using a dual port frame store memory FSM both processes are also disconnected in hardware. Whereas the decoding process needs difficult addressing to implement predictive black coding and possibly motion compensation for which the DRAMs are used, the display process needs very simple addressing to read the images line per line and pixel per pixel which is achieved by using the SAMs. These SAMs do not permit other than consecutive read operation of their different memory locations.

Block to line conversion is implicitly done within the frame store memory FSM. Indeed, by ensuring that predetermined bounds exist on the above mentioned variable number, namely the amount of units contained in, respectively, one stripe and one frame minus one stripe, transfer from DRAM to SAM allows the display means DIS to read the correct data without the need for an extra memory block dedicated to this conversion as in prior art systems.

Following is a description of how FSC controls the storage of NEW1 and the retrieval of OLD via the control signal CTL. Retrieval of NEW2 by the display means DIS will be explained in detail later when describing the working of the latter means.

In the description of the control of FSM by FSC it is assumed that FSC contains a memory map which maps the location of a pixel in an image frame to a memory location of FSM where information pertaining to the latter pixel has to be stored or from where the latter Information has to be retrieved. How this memory map is obtained will be explained later.

Three possible pointer values or memory addresses can be indicated by CTL. In case information pertaining to a new pixel has to be stored, the location in FSM where this information has to be stored, i.e. the value of the earlier mentioned first pointer is passed to the FSM by the module PROC. This location is derived from the contents of OV2 using the earlier mentioned memory map. CTL can also contain the value of the earlier mentioned second pointer when NEW2 has to be passed to DIS for display of the image pixels. More details concerning the latter display are given later when describing DIS. In case of decoding predictive coded information or in case of motion compensation CTL contains the value of a third pointer which is used by PROC to retrieve OLD.

It has to be noted that in case of motion compensation the earlier mentioned motion vector determines together with the first pointer the third pointer. Indeed the motion vector indicates an offset from the new unit to be decoded, the place of which is indicated by the first pointer, to the old unit to be used for that decoding.

Whereas the second pointer simply indicates consecutive addresses in the frame store memory FSM, the first pointer may have to be updated according to stripe or field information, STRIPE and FIELD of OV2 respectively, for instance when a packet is lost or when synchronization on the variable length codes is lost due to transmission errors. Indeed in these cases a simple counting process would result in the total misinterpretation of received packets. Therefore also minimal synchronization information has to be present in the second control Information OV2 at least to give the frame store controller FSC of FIG. 1 a possibility to resynchronize on the applying image data.

The first and the third pointer, thus have to calculated by the frame store controller FSC to Indicate the memory location in the DRAM's pertaining to a particular unit of a frame. The second pointer only has to indicate which SAM has to be accessed. The second pointer can be explicitly determined by the frame store controller FSC and applied-to the frame store memory FSM via terminal CTL to select the right SAM from which NEW2 is retrieved. As an alternative the VIDEOSYNC signal indicating the beginning of a line could be used by the display means DIS to simply access a next SAM.

In the above it was implicitly understood that a memory map existed in the frame store controller FSC with which it could deduce from the location of a unit within an image frame, a corresponding memory location in the frame store memory FSM. This in order to calculate the various pointers. Nothing was said however about how this memory map has to be derived in order to operate the frame store memory FSM correctly and in particular in order to fill the SAMs at the right time with all data pertaining to one line of the image. This will be now clarified.

The frame store memory organisation will be discussed while using the above type of dual port memory IC's of Texas Instruments. These memories are 4 bits wide and 256K addresses long. In order to manage units of decoded video information of 8 bits 2 IC's are taken in parallel. Luminance and chrominance parts of the various signal NEW1, NEW2, OLD, are needed in parallel so again 2 times 2 parallel chips are accessed at the same time. In order to do interframe predictive coding a further parallelization is needed: 2 banks of 2 times 2 chips will be used. In so doing the situation depicted in FIG. 5 is achieved where 8 of the above mentioned chips are used and where two chips are used to store the 8 bits of a unit. This number is doubled in order to separate luminance and chrominance data and further doubled to create two banks of chips. In this way enough memory is available to store all units of one frame.

Firstly the memory map will be discussed without taking into account motion compensation which is discussed further below.

The memory addressing space consists, for every chip, of 9 bits to indicate the row and 9 bits to indicate the column in the memory. With these 18 bits 2 chips are accessed at the same time in order to accomodate units which are 8 bits wide. One further bit selects either the luminance or the chrominance chips of a particular bank. A lost bit is needed to select a bank in which units are to be stored or retrieved, thus resulting in a total of 20 bits for the addressing space of the frame store memory FSM. In order to speed up the addressing two data busses are used for each bank separately which are physically selected in the frame store controller FSC.

As an example, we will now consider specifically the memory map to be used when receiving data conforming to the standard CCIR 601. Standards using other resolutions can equally well be processed by this video decoder without any hardware change. The latter will be demonstrated after completing the description regarding the CCIR 601 case.

In the CCIR 601 standard the location of a unit within a frame has to be expressed within a frame of 576 lines of 720 pixels. Each frame consists of 2 fields of 336 stripes and each stripe of 180 blocks of 64 pixels. The stripes are so organized as to contain all units of 8 consecutive lines and the corresponding blocks. 90 blocks of a stripe are dedicated to two types of chrominance data, namely CB and CR, whereas all other 90 blocks of such a stripe are used for luminance data. All of the above is well known in the art. This information results in a frame addressing space as shown in the following table:

| | |
|---|---|
| F0 | Field Number |
| S5-S0 | Stripe Number (6 bits limited to 35) |
| B6-B0 | Block Number (7 bits limited to 95) |
| P5-P0 | Pixel Number (6 bits) |
| L/C | Luminance or Chrominance |

Thus the frame addressing space is 21 bits wide whereas the memory addressing space, also counting the bank number, is 20 bits wide. Some calculation thus has to take place to determine the location of a unit in the memory map and the value of different pointers which is implemented in the frame store controller FSC. It is to be noted that stripe and field numbers can be checked by FSC based on the second control information OV2, and particularly the FIELD and STRIPE parts thereof, whereas the pixel and block number have to be derived by internally counting the decoded number of units.

To be further noted that the above memory addressing space is only relevant for the DRAMs, the access of the SAMs being described later.

Even and odd lines of a frame will be accorded a memory place in different banks to reduce timing problems as clarified hereafter. In this way the two different data busses are maximally used because, in decoding one block, every 8 consecutive pixels will belong to alternating banks.

A second important consideration is that all the units pertaining to one display line and category, i.e. either luminance or chrominance, should be wherever possible in one chip. In this way the SAM is most effectively used as these units of one video line can be transferred, with an existing internal mechanism of the mentioned memory chip, from the DRAM to the SAM and the display means DIS can simply read this SAM serially to display this video line.

In the CCIR 601 case this is not possible because of the number of pixels on such a video line. Indeed, the amount of units contained in one such a line exceeds the capacity of one SAM. In this case as few SAM's as possible should be used to store such a long video line. By alternating the banks for even and odd lines the display means DIS will also use alternating banks in the display means. To be noted is that the block to line conversion within the one frame store memory FSM can be implemented in this way.

It can be further said that by using parallel access to 2 chips to accomodate units of 8 bits wide the one chip mentioned in this paragraph physically conforms to those 2 chips put in parallel.

Alternating the lines in two different banks can be achieved easily by letting bit P3 select the bank. It can be verified that in using an address translater table and an address matching as in the following tables the above demands are met.

TABLE 1

| Address Translator | | | | | | | | | | | |
|---|---|---|---|---|---|---|---|---|---|---|---|
| | B6 | B5 | S5 | S4 | S3 | S2 | A4 | A3 | A2 | A1 | A0 |
| First 512 Pixels | 0 | x | x | x | x | x | S5 | S4 | S3 | S2 | B5 |
| Stripes 0–31   36–67 | 1 | 0 | 0 | x | x | x | 1 | 1 | S3 | S2 | S4 |
| Stripes 32–35   68–71 | 1 | 0 | 1 | 0 | 0 | 0 | S5 | S4 | 1 | S2 | S4 |
| Stripes 36–39   72–75 | 1 | 0 | 1 | 0 | 0 | 1 | S5 | S4 | 1 | S2 | S4 |
| Forbidden | 1 | 0 | 1 | 0 | 1 | x | — | — | — | — | — |
| Forbidden | 1 | 0 | 1 | 1 | x | x | — | — | — | — | — |
| Forbidden | 1 | 1 | x | x | x | x | — | — | — | — | — |

In the above Table 1 the symbols A0; . . . ; A4 are needed to reduce the frame addressing space with 21 bits to an intermediate addressing space with only 20 bits in order to be compatible with the memory addressing space. The translation from this intermediate addressing space to the memory addressing space is done according to the following table.

TABLE 2

| Address Matching | | | | | | | | | | |
|---|---|---|---|---|---|---|---|---|---|---|
| | Bank | Row Address | | | | | | | | |
| L | P3 | F0 | A4 | A3 | A2 | A1 | S1 | S0 | P5 | P4 |
| C | P3 | F0 | A4 | A3 | A2 | A1 | S0 | P5 | P4 | S1 |
| | Bank | Column Address | | | | | | | | |
| L | P3 | A0 | B4 | B3 | B2 | B1 | B0 | P2 | P1 | P0 |
| C | P3 | A0 | B4 | B3 | B2 | B1 | P2 | P1 | P0 | B0 |

With reference to the above address matching Table 2 it can be said that the frame store controller FSC, by counting the decoded units in every new stripe can easily determine whether a new unit of decoded video information is to be stored in a luminance or a chrominance memory chip "L" for address matching, whereas in the latter case it will be the line after "C" in the same table. For chrominance data it is further important that, although two types of chrominance data, namely CB and CR, arrive separately in separate blocks, these two types should be interleaved in the frame store memory for correct operation of the display means DIS. It can be verified that this is achieved by rotating the last four bits, with respect to the luminance case of the column address when chrominance data is received, which is shown in Table 2. For simplicity's sake the same measure is taken for the row address as can also be seen in Table 2. In using the above tables also the two different types of chrominance data, namely CB and CR, are automatically demultiplexed according to the CCIR 601 case. The above results In a memory map according to the following Table 3 wherein only one bank containing either the even or the odd lines is considered.

TABLE 3

| | Memory Map | | | | | | |
|---|---|---|---|---|---|---|---|
| Rows | Columns 0–255 | | | | Columns 256–512 | | |
| 0–15 | St | 0–3 | Pi | 0–255 | St | 0–3 | Pi | 256–511 |
| 16–31 | St | 4–7 | Pi | 0–255 | St | 4–7 | Pi | 256–511 |
| 32–127 | | ... | | | | ... | | |
| 128–143 | St | 32–35 | Pi | 0–255 | St | 32–35 | Pi | 256–511 |
| 144–159 | Reserved for MC | | | | Reserved for MC | | |
| 160–175 | St | 32–35 | Pi | 512–719 | Unused | | |
| 176–191 | Reserved for MC | | | | Unused | | |
| 192–207 | St | 0–3 | Pi | 512–719 | St | 16–19 | Pi | 512–719 |
| 208–223 | St | 4–7 | Pi | 512–719 | St | 20–23 | Pi | 512–719 |
| 224–239 | St | 8–11 | Pi | 512–719 | St | 24–27 | Pi | 512–719 |
| 240–255 | St | 12–15 | Pi | 512–719 | St | 28–31 | Pi | 512–719 |
| 256–271 | St | 36–39 | Pi | 0–255 | St | 36–39 | Pi | 256–511 |
| 272–287 | St | 40–43 | Pi | 0–255 | St | 40–43 | Pi | 256–511 |
| 288–383 | | ... | | | | ... | | |
| 384–399 | St | 68–71 | Pi | 0–255 | St | 68–71 | Pi | 256–511 |
| 400–415 | Reserved for MC | | | | Reserved for MC | | |
| 416–431 | St | 68–71 | Pi | 512–719 | Unused | | |
| 432–447 | Reserved for MC | | | | Unused | | |
| 448–463 | St | 36–39 | Pi | 512–719 | St | 52–55 | Pi | 512–719 |
| 464–479 | St | 40–43 | Pi | 512–719 | St | 56–59 | Pi | 512–719 |
| 480–495 | St | 44–47 | Pi | 512–719 | St | 60–63 | Pi | 512–719 |
| 496–511 | St | 48–51 | Pi | 512–719 | St | 64–67 | Pi | 512–719 |

In the above Table 3 St stands for stripes and the numbers indicate the numbers of such stripes within the frame. Also in the-above Table 3 Pi stands for pixels and the numbers indicate the numbers of such pixel within a video line of the frame, St 0-3 Pi 0-255 for instance denotes the first 256 pixels of the, even or odd, video lines comprised in the first 4 stripes of the frame.

From the above memory map it follows that some overhead capacity is available in the frame store memory FSM, i.e., some parts of these memory are never used in the above case. This overhead can be used to implement motion compensation using a non permanent memory map which will be clarified hereafter.

Allowing negative motion vectors means that the above permanent memory map is not suitable for motion compensation because old units, indicated by such a negative motion vector, are already overwritten by new units when they are needed for the motion compensation scheme. The free space of Table 3 referred to as "reserved for MC" will be used to overcome these problems. Because there is no time to copy data to this free space a non permanent memory map has to be used. In so doing the memory location in which a particular unit within a frame is to be found, changes with each consecutive frame received. This is accomplished when, for instance, a new unit is written 16 columns under its corresponding old unit. With this principle a negative or positive motion vector of at most 4 stripes is allowed which is mope than prior art systems allow. In the light of the above description this principle can be implemented by a person skilled in the art and it is therefore not described in more details.

Figure 6:
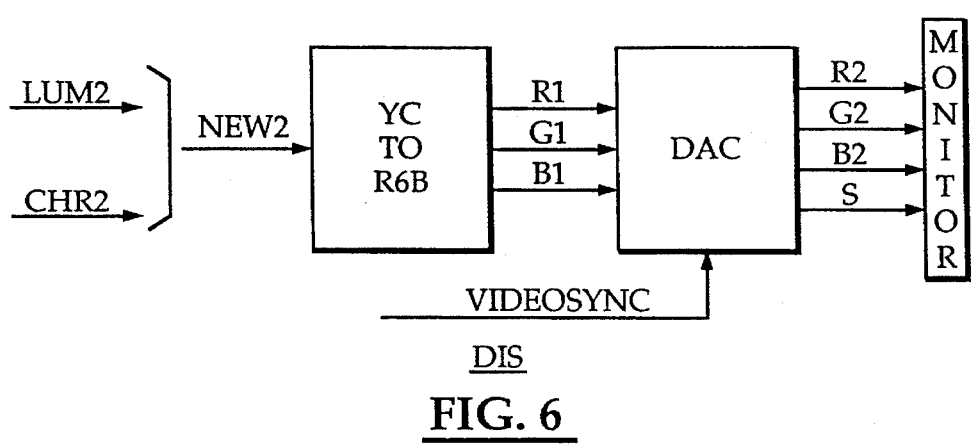
FIG. 6 represents a more detailed view of the display means DIS of FIG. 1.

With reference to FIG. 6 the block schematic of the display means DIS will now be briefly discussed. DIS has as input the signal NEW2 which consists of signals LUM2 and CHR2 retrieved from the frame store memory FSM and respectively containing the luminance and chrominance of the pixels. This input signal is first applied to a block YCTOR6B transforming it into red/green/blue format appropriate for the display. The latter block has three outputs R1, G1, B1 respectively corresponding to respectively the amount of red, green and blue color in a particular pixel. These outputs are applied to a digital to analog conversion block DAC. The latter block also having as input the signal VIDEOSYNC from the pixel processor PROC and which indicates the beginning of a new image line as needed for the display of an image.

The block DAC has 4 outputs R2, G2 B2 and S respectively on which like named analog signals are applied. These signals drive a video screen MONITOR which displays the video signal. Display means such as DIS ape well known in the art and a person skilled in the apt should be able to implement it without difficulties.

To be noted that the frame store controller FSC of FIG. 1 can be so designed as to be able to change the resolution of the display or to adapt to a change of the resolution of the received information, e.g. by decoding video information according to CIF instead of CCIR 601 resolutions, and this without any hardware change. For the latter the only restriction is that the frame store memory FSM, in decoding predictively coded data, has to be large enough to contain all the units needed in such a standardized frame.

For instance the second control information OV2 could be used to send a signal indicating that, instead of receiving CCIR 601 frames, H261 frames are being decoded. The frame store controller then only has to use a different memory map for these different frames, the derivation of such a memory map is obvious to a person skilled in the art in the light of the above.

Due to the asynchronous working of the decoder the display and the decoding means do not have to work at the same resolution and this resolution can consequently be changed during operation, e.g. it could be used to zoom, under control of signal EXT, on a particular part of a frame by adding new units by interpolation or by simply influencing the display means through the second pointer to display only some units in the frame store memory FSM.

The above features can for instance require that the overall system clock SC be divided under control of the external control signal EXT by the frame store controller FSC to achieve appropriate processing speeds for the two processes. The latter features can also be realized by the decoding means DEC1 and DEC2 by skipping skipping some packets or by the frame store controller FSC by skipping some units and use the thus gained time to implement e.g. interpolation.

When receiving for instance video information according to a coarser resolution than that specified by CCIR 601, the frame store controller FSC can control the decoding means DEC1 and DEC2 to create intermediate new units from the received new units, i.e. calculate them via upsampling. All these new units can then be stored in the frame store memory FSM in using the above specified memory map. This results in the possibility to use, e.g. a same CCIR 601 standardized, monitor whatever is the resolution of the received video information.

An important aspect of the present invention is to avoid image degradation caused by the crossing of the first and the second pointer as described in detail earlier. When block coded video information is used a somewhat more stringent demand is to be met to avoid any image degradation namely the two pointers should not correspond to pixels within one stripe. Indeed, when the latter would happen the display means DIS would display partly old units and partly new units of the handled stripe, because the display is line or stipe oriented whereas the decoding is block oriented. Therefore, the variable number should remain within predetermined bounds, i.e. between one stripe, and one frame minus one stripe to avoid any image degradation.

Figure 7:
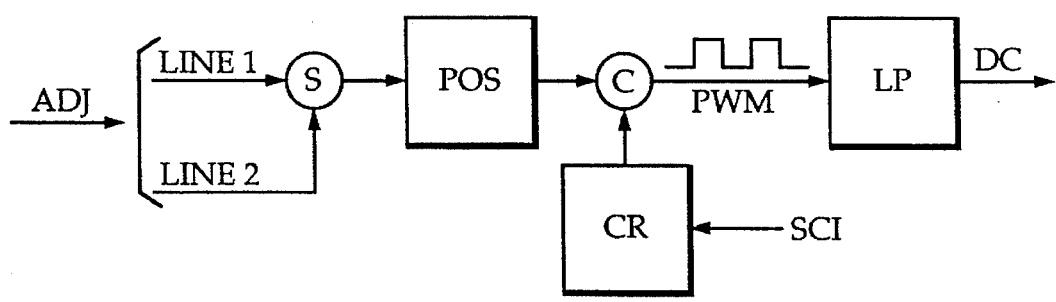
FIG. 7 shows a hardware configuration of the control means CON of FIG. 1.

The above is achieved by the control means CON depicted in FIG. 7. CON receives an input signal ADJ from the frame store controller FSC of FIG. 1 and which is constituted by a first line number LINE1 and a second line number LINE2, respectively indicative of which line a frame is currently processed by the decoding means DEC1 and DEC2, and the display means DIS. The second line number LINE2 is sustracted from the first line number LINE1 in a substraction module S and the result is fed into a block POS calculating from said result a number between 0 and the total number of lines contained in the frame minus one. The output of the latter block is compared in a comparator circuit C with a counter value which is the output signal of a module counter CR counting from zero to the above mentioned total number minus one, The latter module counter CR counts with a frequency determined by a clock input signal SC1 derived after division (not shown) from the system clock signal SC and which for sake of clarity is not shown in FIG. 1.

The output of the comparator C is a pulse width modulated signal PWM which is fed into a low pass filter LP the output signal DC of which is used to control the frequency of the system clock SC.

The block POS converts the result of the subtraction to a value indicative of the earlier mentioned variable number. It avoids that negative results are further used by the control means, these negative values corresponding to cases where the implicit buffer crosses the boundaries of the frame store memory FSM as already discussed with reference to FIG. 2b. The value indicative of the variable number in case of negative value is obtained by adding the negative result to the aforementioned total number.

To be noted is that the difference between LINE2 and LINE1 is not exactly equal to the variable number but is indicative of that number. The first line number LINE1 control is indeed derived from the second control information OV2 by the frame store controller FSC by multiplying the stripe number STRIPE by 8 thereby indicating the last line of a stripe, whilst the second line number LINE2 is derived by the frame store controller FSC from the second pointer. An alternative would be to use the pixel locations derived from the first and second pointers but this leads to an output value changing in relatively large steps due to the fact that the first pointer indicates a pixel block of an image whereas the second pointer indicates a display line.

The output of POS, which is indicative of the variable number, is compared with a predetermined value, e.g. half of the mentioned total number as produced by the counter COUNTER. When the output signal is larger than the predetermined value which means that the number of pixels located between the locations indicated by the second and the first pointer is greater than a predetermined value, then wide pulses are produced at the output of the comparator whereas the opposite case leads to narrow pulses. Wide pulses produce, after the low pass filtering in the block LOW PASS, a larger signal DC speeding up the frequency of the system clock SC, which results in a higher retrieval rate of information from FSM by DIS. This way the display process catches up with the decoding process, thereby reducing the variable number of units between the second and the first pointer.

On the other hand when the output signal of POS is smaller than the predetermined value, smaller pulses are produced by C, which results in a smaller signal DC and a slowing down of the frequency of the system clock SC and thus a lower retrieval rate of information by DIS.

The above control means CON in so doing indirectly tunes the display process to the information rate produced by the encoder without needing dedicated phase lock loop circuitry and large input buffers in INT of FIG. 1.

To be noted is that the delay jitter and the varying information density In the received packets, in case of variable bit Pate coding, have little influence on the stability of the frequency of the system clock SC thus keeping the video decoder compatible with existing display standards such as CCIR 601 or PAL. The mentioned varying information density does lead to fluctuations in the variable number because some packets result in many units being decoded at a fast rate whereas other packets only carry information relating to few units hence giving rise to a slow decoding rate, but the instability of the frequency of SC can be bounded by determining a suitable cut-off frequency of the low-pass filter LR so that the variable voltage DC can at most vary with the latter frequency thereby keeping the mentioned instability within predetermined bounds. A cut-off frequency of e.g. 1 Hz suffices to achieve a sufficiently stable clock frequency. It is further required that the frequency of the pulse width modulated signal PWM is high enough, therefore the clock input signal SC1 to the module counter CR should for instance have a frequency high enough to ensure that the former frequency is for instance 1 HHz. In any case the frequency of SC1 should be such that enough samples of the output signal POS are taken within the time needed to display a frame, i.e., this frequency SC1 should at least be larger than one frame period divided by the mentioned total number. The problem of achieving a sufficiently stably system clock SC can be alleviated further thanks to a small input buffer used to smooth out the delay jitter as already mentioned earlier.

It was already mentioned that at any time within the display the displayed image can be frozen by controlling the frame store controller FSC, via the external control input EXT, to skip all incoming information by simply not writing it in the frame store memory FSM. Similarly the video decoder can be used to display still pictures e.g. according to the above mentioned JPE6 standard. The wish to use such a feature can be indicated in the second control information OV2. To this end, if the control means CON is used, its control action has to be suspended e.g. by allowing the frame store controller FSC to predefine the adjust signal ADJ.

While the principles of the invention have been described above in connection with specific apparatus, it is to be clearly understood that this description is made only by way of example and not as a limitation on the scope of the invention.

We claim:

1. Video decoder, receiving packets from a packet switching network, said packets containing control information (OV1; OV2) and video information (VI), and said video decoder being able to process real time moving video images and including:

(a) decoding means (DEC1, DEC2) deriving from at least said video information (VI) new units of decoded video information (NEW1) relating to a current video frame;

(b) a memory module (FSM) in which said new units (NEW1) are stored as stored new units (NEW2), each one of said stored new units (NEW2) corresponding to one of said new units (NEW1);

(c) display means (DIS) displaying said stored new units (NEW2) on a video screen; wherein after one of said new units (NEW1) is derived and stored in said memory module (FSM) as one of said stored new units (NEW2), said display means retrieves a variable number of said stored new units (NEW2) from said memory module (FSM) for display, before retrieving said one of said stored new units (NEW2), and wherein said variable number of said stored new units (NEW2) being retrieved for display by said display means varies between a first predetermined number and a second predetermined number for each one of said new units (NEW1) prior to displaying a corresponding one of said stored new units (NEW2).

2. Video decoder according to claim 1, wherein said decoding means (DEC1, DEC2) retrieves from said memory module (FSM) old units of decoded video information (OLD) relating to a previous video frame to derive therefrom said new units (NEW1) thereby decoding predictively coded video information.

3. Video decoder according to claim 2, wherein said memory module controller (FSC) is able to control said video decoder to display images differing from those contained in said video information (VI) by controlling said decoding means (DEC1, DEC2) to calculate intermediate new units of decoded video information and, to store at least part of said new units (NEW1), including said intermediate new units, according to a memory map corresponding to a desired display, said desired display being signalled to said memory module controller (FSC) by an appropriate control input signal (EXT; OV2).

4. Video decoder according to claim 2, wherein said decoder further includes a memory module controller (FSCJ controlling at least a first and second pointer (P1; P2) used by said decoding means (DEC1, DEC2) and said display means (DIS) respectively, said pointers (P1; P2) indicating which memory location of said memory module (FSM) is to be used by said decoding means (DEC1, DEC2) and said display means (DIS), respectively, to store said new units (NEW1) or retrieve said stored new units (NEW2), and that the values of said first and of said second pointers (P1; P2) are asynchronously updated by said memory module controller (FSC) when said decoding means (DEC1, DEC2) and said display means (DIS) have respectively stored one of said new units (NEW1) or retrieved one of said stored new units (NEW2).

5. Video decoder according to claim 4, wherein said memory module (FSM) capacity is additionally used by said memory module controller (FSC) to realize motion compensation by using a non-permanent memory map, mapping a location of each of said new units (NEW1) within a frame onto memory locations of said memory module (FSM), each of said new units (NEW1) being stored in locations other than the location in which corresponding ones of said old units (OLD) were stored.

6. Video decoder according to claim 4, wherein each of said new units (NEW1), said stored new units (NEW2) and said old units (OLD) is subdivided into a plurality of different parts, each of said different parts of each unit corresponding to different categories (LUM, CHR) of a video image, each of said different parts of each unit containing video information relating to a same video image, and that said parts of said new units (NEW1) and said old units (OLD) of video information of different categories are processed by said decoding means (DEC1, DEC2) regardless of their category and that said memory module controller (FSC) demultiplexes said parts of said new units (NEW1) and said old units (OLD) according to the category they belong by writing said parts of said new units (NEW1) and said old units (OLD) in appropriate memory locations within said memory module (FSM).

7. Video decoder according to claim 4, wherein said memory module (FSM) comprises a dual port random access memory including at least one dynamic random access memory (DRAM1, . . . , DRAM8) and at least one serial access memory (SAM1, . . . , SAM8), that said dynamic random access memory is accessed by said decoding means (DEC1, DEC2) to store said new units (NEW1) on locations indicated by said first pointer (P1) and to retrieve said old units (OLD) from a location indicated by a third pointer also controlled by said memory module controller (FSC), and that all of said stored new (NEW2) units corresponding to one line in said current video frame transferred under control of said memory module controller (FSC) from said dynamic random access memory to said serial access memory and that said display means (DIS) retrieves said stored new units (NEW2) from locations in said serial access memory indicated by said second pointer (P2).

8. Video decoder according to claim 4, wherein said memory module controller (FSC) performs said updates according to a memory map mapping a location of each of said new units (NEW1) within a video frame onto memory locations of said memory module (FSM).

9. Video decoder according to claim 8, wherein said video information (VI) corresponds to images of one of a plurality of resolutions, said one of a plurality of resolutions being identified by said video decoder based on at least part of said control information (OV1, OV2) and that said memory module controller (FSC) adapts said video decoder to said one of a plurality of resolutions by using a corresponding memory map of a plurality of memory maps.

10. Video decoder according to claim 2, wherein said decoder further includes a control means (CON) which monitors said variable number and which increases or decreases a frequency of a system clock (SC), included in said video decoder and controlling at least said display means (DIS), thereby preventing said variable number from becoming larger or smaller than a first and second predetermined number respectively.

11. Video decoder according to claim 10, wherein said system clock (SC) additionally controls at least said decoding means (DEC1, DEC2).

12. Video decoder according to claim 10, wherein said control means (CON) derives from part of said control information a value indicative of said variable number and speeds up or slows down said system clock (SC) if said value is respectively higher or lower than a predetermined value thereby assuring that said display means (DIS) processes each of said stored new (NEW2) units only once.

13. Video decoder according to claim 12, wherein said value indicative of said variable number is derived from said control information (OV1, OV2).

14. Video decoder according to claim 13, wherein an amount of stored new units is related to a current video frame, said predetermined value is half of said amount, said control means (CON) compares said predetermined value with a counter value, obtained by counting modulo said amount within one frame period, and the DC component (DC) of a pulse width modulated signal (PWM) indicative of the result of said comparison is used to control the frequency of a system clock (SC).

15. Video decoder according to claim 12 wherein said value indicative of said variable number derived by said control means (CON) is equal to the difference between a number of a line (LINE2) within a frame currently processed by said display means according to said second pointer (P2) and a number of line (LINE1) within a video frame to be processed by said decoding means (DEC1, DEC2) according to said first pointer (P1).

16. Video decoder according to claim 15, wherein an amount of stored new units is related to a current video frame, said predetermined value is half of said amount, said control means (CON) compares said predetermined value with a counter value, obtained by counting modulo said amount within one frame period, and the DC component (DC) of a pulse width modulated signal (PWM) indicative of the result of said comparison is used to control the frequency of said system clock (SC).

17. Video decoder according to claim 1, wherein said decoder further includes a control means (CON) which monitors said variable number and which increases or decreases the frequency of a system clock (SC), included in said video decoder and controlling at least said display means (DIS), thereby preventing said variable number from becoming larger or smaller than said first and second predetermined number respectively.

18. Video decoder according to claim 17, wherein said system clock (SC) additionally controls at least said decoding means (DEC1, DEC2).

19. Video decoder according to claim 17, wherein said video information (VI) is block using a variable bit rate technique, and that said first predetermined number is equal to a first number of units contained in one stripe and that said second predetermined number is equal to a second number of units contained in one frame minus one stripe.

20. Video decoder according to claim 17, wherein said video decoder can at any time change to a display of a still picture by not refreshing said memory module (FSM) with new units of video information, said control means (CON) being deactivated during said display of a still picture.

21. Video decoder according to claim 17, wherein said control means (CON) derives from part of said control information a value indicative of said variable number and speeds up or slows down said system clock (SC) if said value is respectively higher or lower than a redetermined value thereby assuring that said display means (DIS) processes each of said stored new (NEW2) only once.

22. Video decoder according to claim 21, wherein said value is derived from said control information (OV1; OV2).

23. Video decoder according to claim 21, wherein said value derived by said control means (CON) is equal to the difference between a number of a line (LINE2) within a frame currently processed by said display means according to said second pointer (P2) and a number of line (LINE1) within a video frame to be processed by said decoding means (DEC1, DEC2) according to said first pointer (P1).

24. Video decoder according to claim 23, wherein an amount of stored new units is related to a current video frame, said predetermined value is half of said amount, said control means (CON) compares said predetermined value with a counter value, obtained by counting modulo said amount within one frame period, and the DC component (DC) of a pulse width modulated signal (PWM) indicative of the result of said comparison is used to control a frequency of a system clock (SC).

25. Video decoder according to claim 23, wherein an amount of stored new units is related to a current video frame, said predetermined value is half of said amount, said control means (CON) compares said predetermined value with a counter value, obtained by counting modulo said amount within one frame period, and the DC component (DC) of a pulse width modulated signal (PWM) indicative of the result of said comparison is used to control the frequency of said system clock (SC).

* * * * *

UNITED STATES PATENT AND TRADEMARK OFFICE
CERTIFICATE OF CORRECTION

PATENT NO. : 5,453,790
DATED : September 26, 1995
INVENTOR(S) : Vermeulen et al.

It is certified that error appears in the above-indentified patent and that said Letters Patent is hereby corrected as shown below:

Claim 4, column 22, line 39 "(FSCJ" should read --(FSC)--.

Claim 19, column 24, line 33 after "block", insert --coded--.

Claim 21, column 24, line 47 "redetermined" should read --predetermined--.

Claim 21, column 24, line 49 after "new", insert --units--.

Signed and Sealed this

Twenty-third Day of July, 1996

Attest:

BRUCE LEHMAN

*Attesting Officer*  *Commissioner of Patents and Trademarks*